United States Patent Office 3,440,651
Patented Apr. 22, 1969

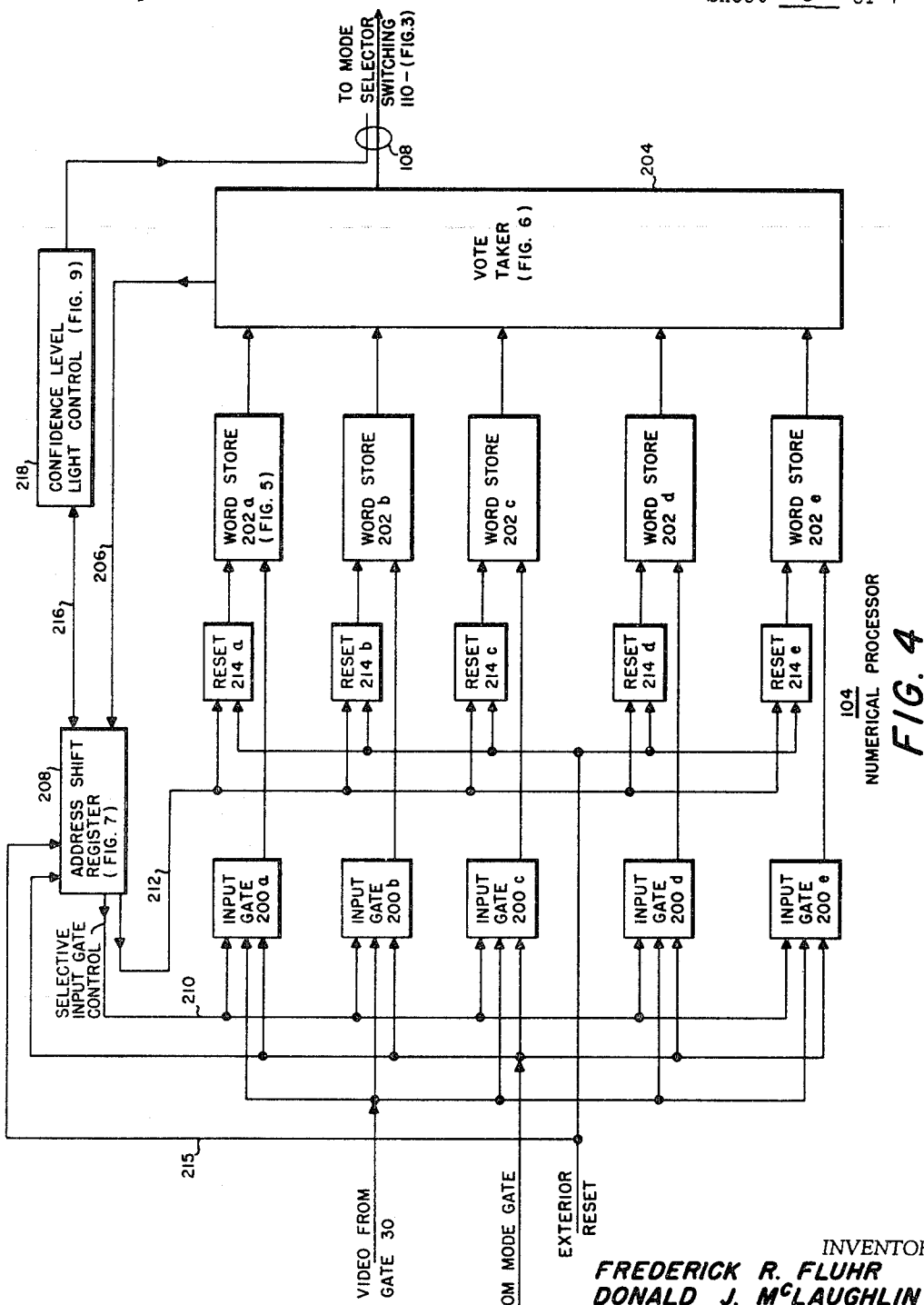

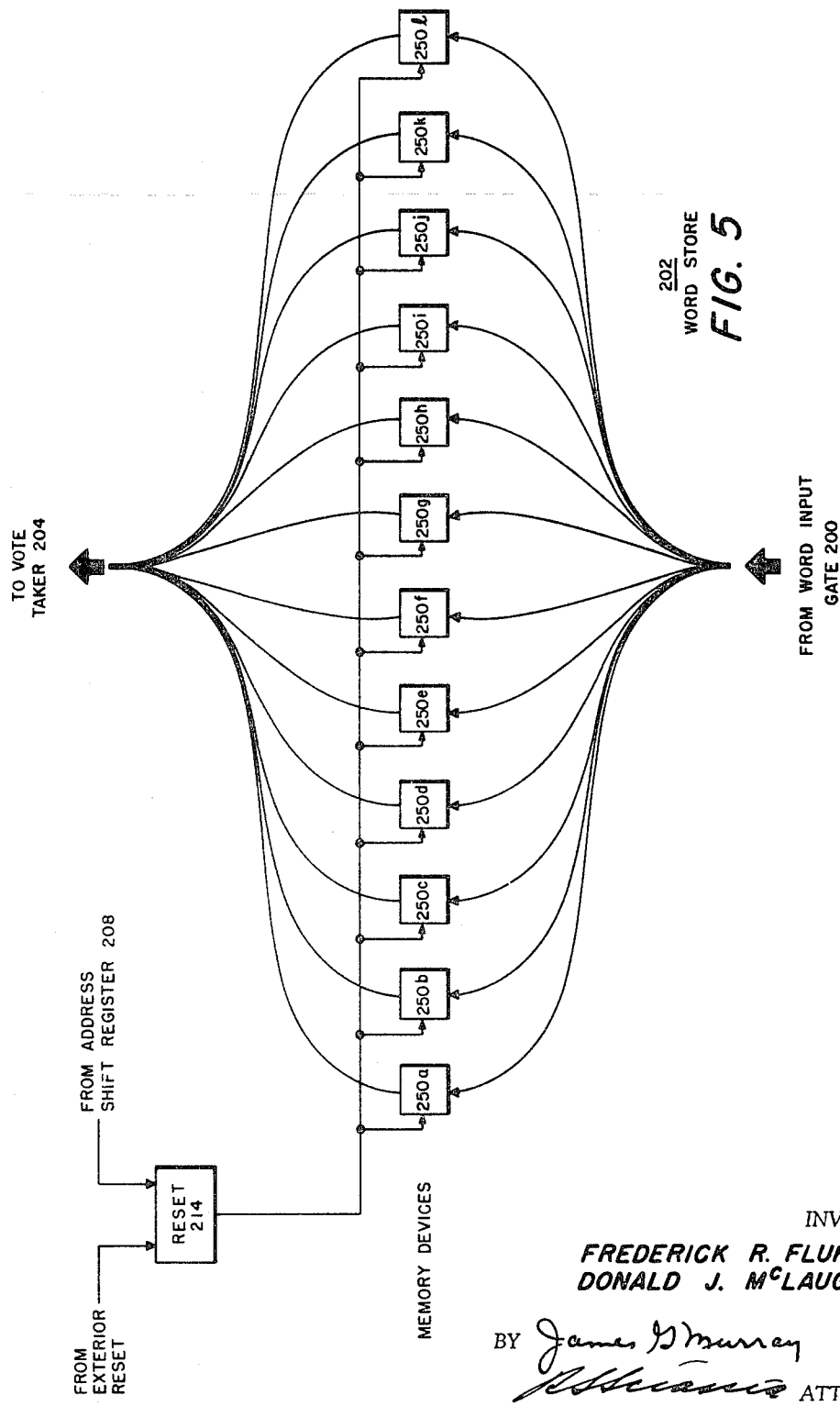

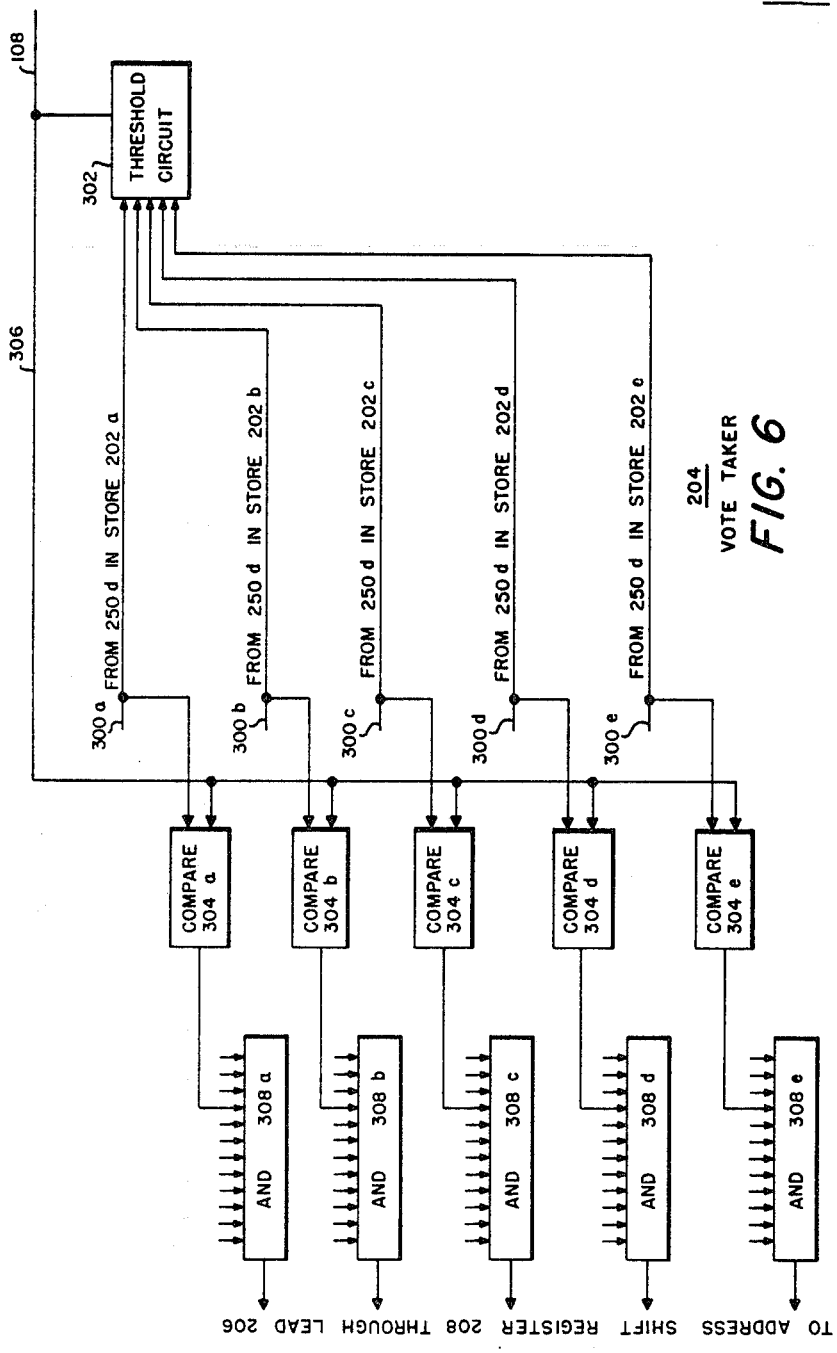

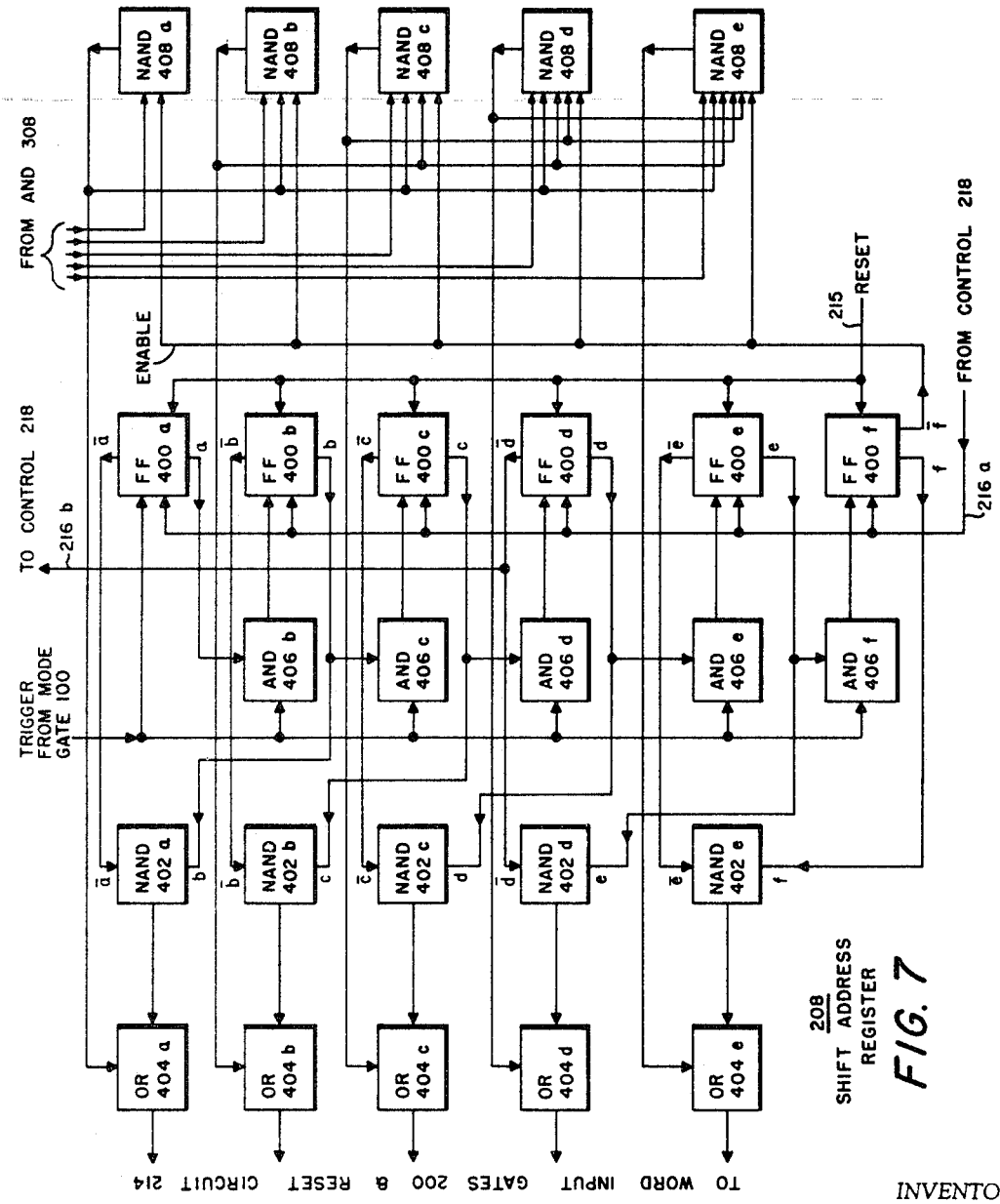

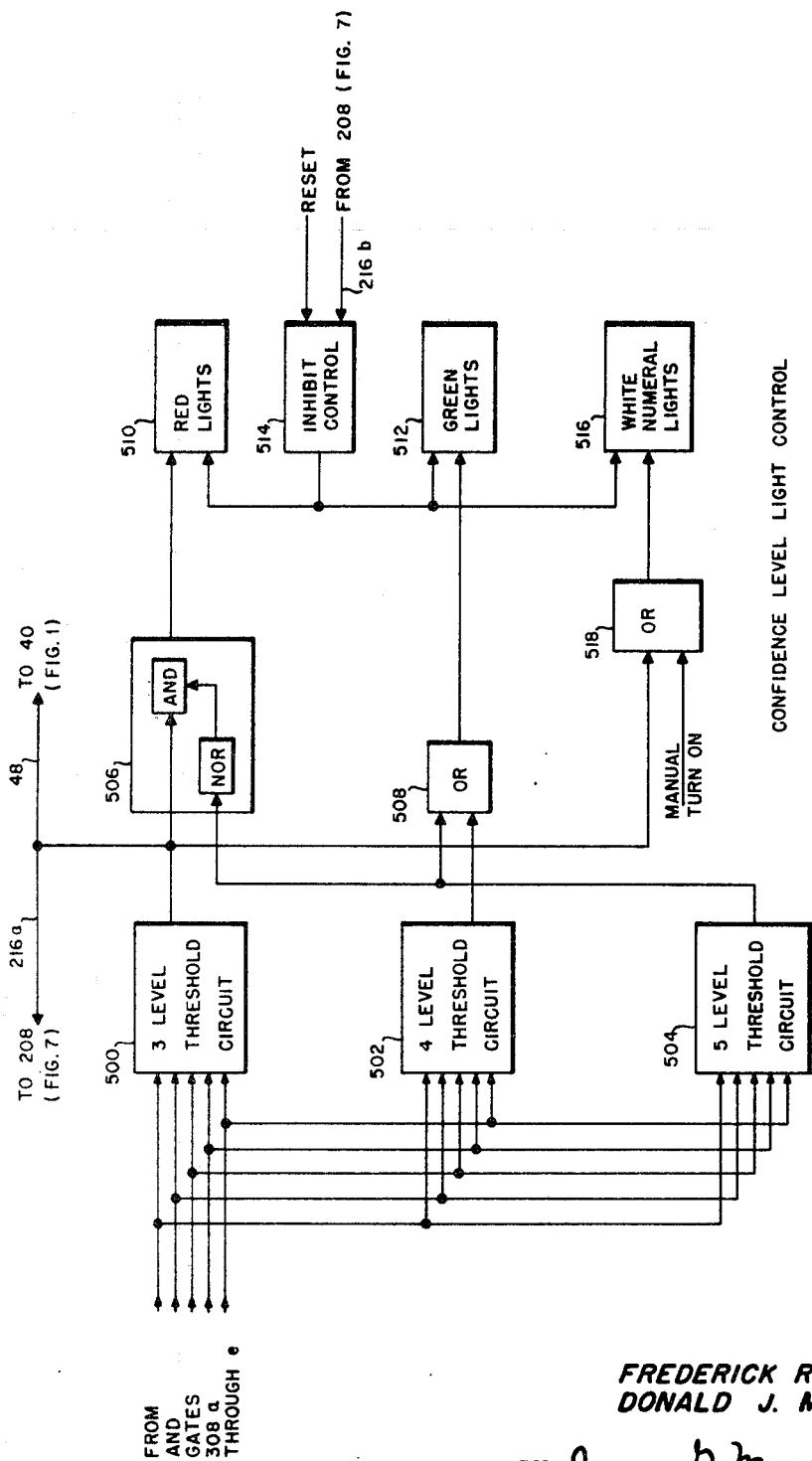

3,440,651
IFF ACTIVE READOUT CONTROL AND DISPLAY SYSTEM
Frederick R. Fluhr, Oxon Hill, Md., and Donald J. McLaughlin, Washington, D.C., assignors to the United States of America as represented by the Secretary of the Navy
Filed Sept. 1, 1966, Ser. No. 577,116
Int. Cl. G01s 9/56
U.S. Cl. 343—6.5                  23 Claims

ABSTRACT OF THE DISCLOSURE

IFF display and processing system wherein replies from a selected target are compared and the agreement between the replies is evaluated and displayed with color coding indicative of the degree of agreement.

---

Figure 1:
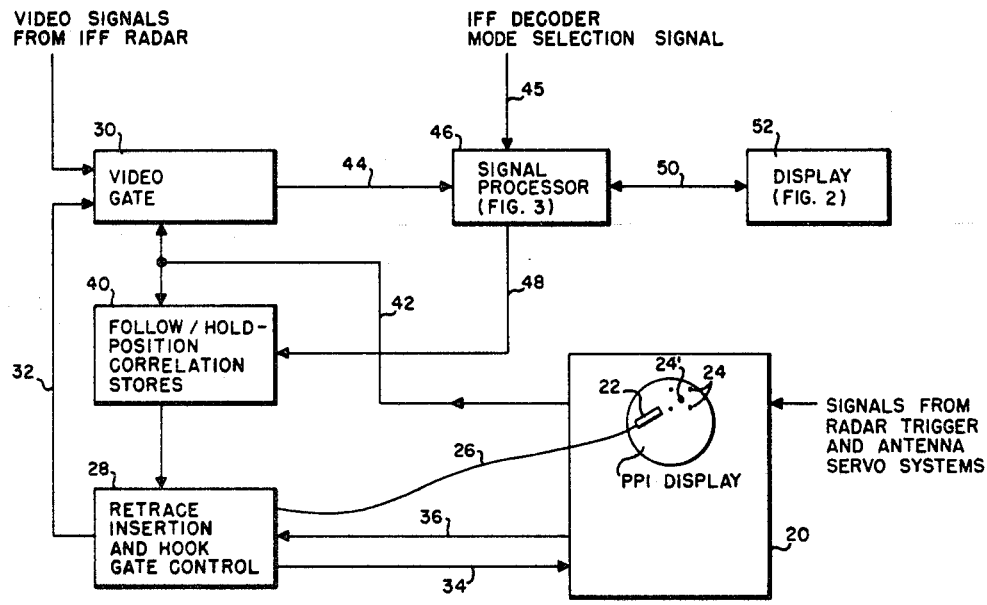

The invention described herein may be manufactured and used by or for the Government of the United States of America for governmental purposes without the payment of any royalties thereon or therefore.

The present invention relates to an IFF active readout control and display and more particularly to a PPI type system wherein maximum use is made of target IFF replies in any one of several modes to furnish a numerical and coordinate position display of the target identified together with an indication of the confidence level of the target identification.

There are many security sensitive areas, such as in the Navy Fleet and at war area airports, where air traffic must not only be controlled in the conventional sense, which is in itself a highly complex problem, but must also be completely identified. Identification is usually accomplished by some form of IFF (Identification Friend or Foe) where the surface station transmits an interrogating signal which energizes a transponder on friendly aircraft to transmit a coded signal that includes the identity of the aircraft and often its altitude. The processing of the IFF response signals at the surface station is a most critical problem, particularly when the volume of air traffic is large. Because of the excessive time required to determine the identify of each aircraft, the prior IFF reply display and processing systems have generally been regarded as inadequate.

The general purpose of this invention is to provide an improved IFF reply display and processing system wherein maximum use is made of the IFF target replies and a level of confidence in such replies is indicated. This is accomplished by a system which includes the combination of a radar plan position indicator (PPI) and means by which a target area may be easily and quickly selected and a display arrangement which indicates the identity of replying targets in the selected area and, by color background, the confidence level of the reply from the targets in the selected area. In addition, the position of targets replying with an acceptable level of confidence is displayed on the PPI. The display arrangement is very flexible as to what information is displayed and includes provisions for displaying the results of any of four modes of interrogation. The display can be controlled, if desired, by using the desired IFF information from automatic command and control systems engaged in target tracking.

An object of the present invention is, therefore, the provision of an improved IFF reply display and processing system.

Another object of this invention is to provide an improved IFF reply display and processing system which indicates both the level of confidence in the displayed reply and the position of targets replying with an acceptable level of confidence.

A further object of the invention is the provision of an improved IFF reply display and processing system wherein maximum use is made of the IFF target replies.

A still further object is to provide an improved IFF reply display and processing system which can be easily and quickly controlled to receive and display IFF replies from a selected area; which displays, by color background, the confidence level of the target replies displayed; which provides a flexibility allowing for target interrogation and reply display in any of four modes and in which the location of the replying target is derived and displayed.

Figure 2:
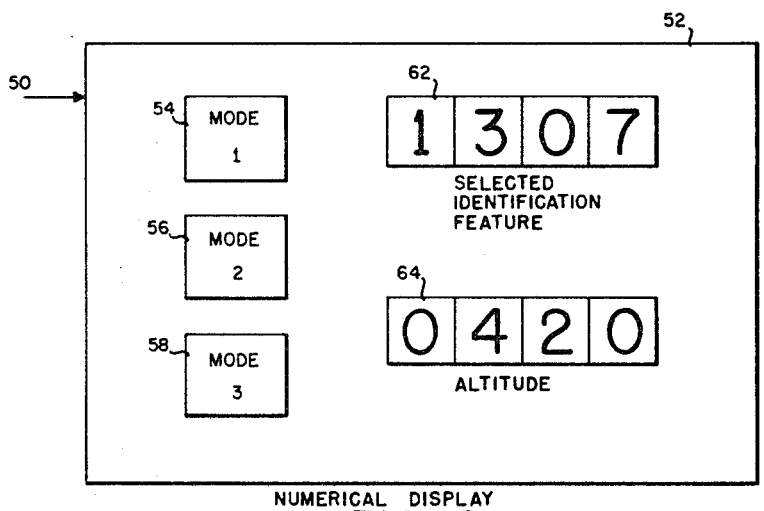
Figure 8:
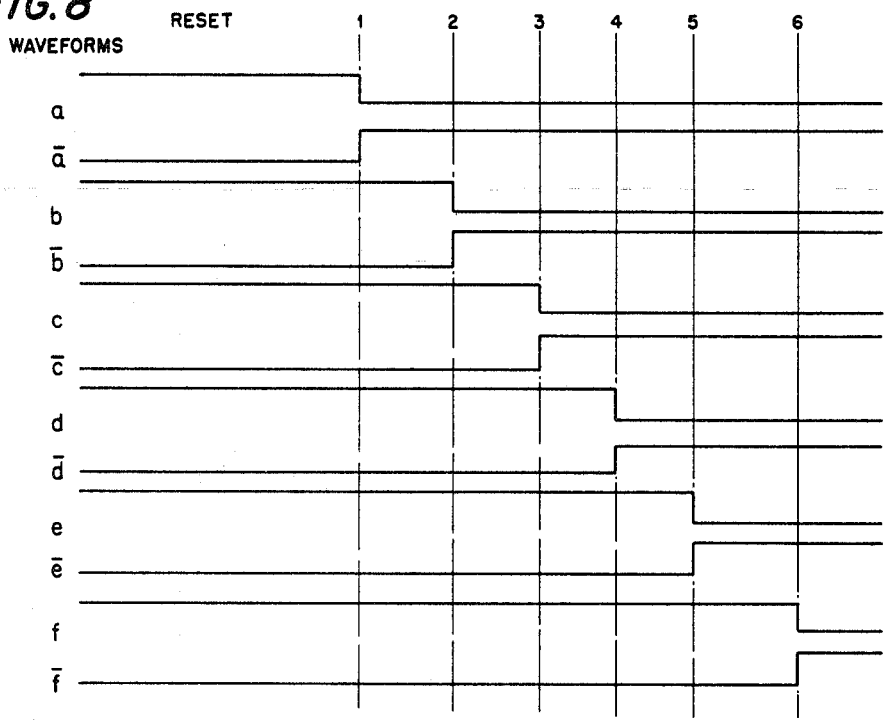
Figure 3:
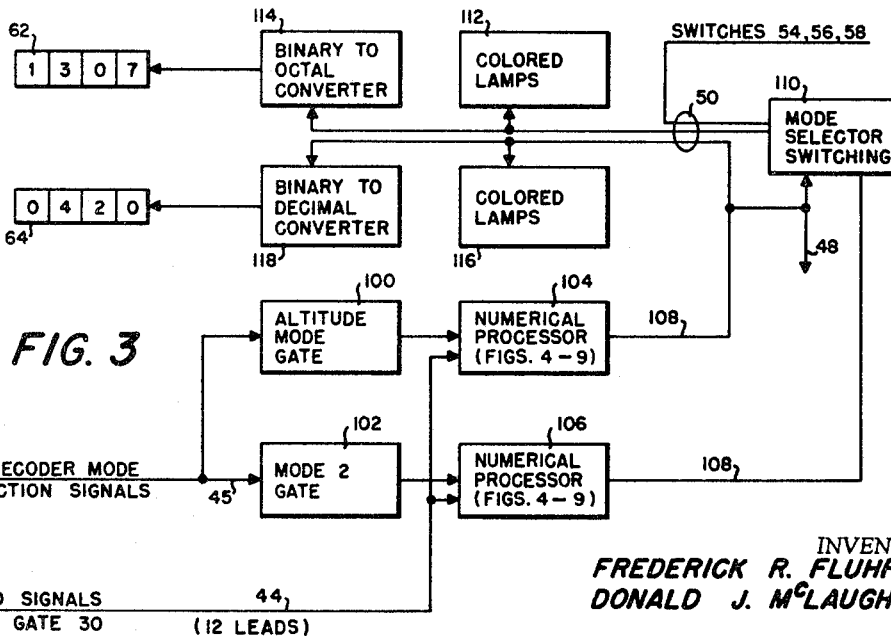

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a diagrammatic illustration of the invention;
FIG. 2 shows the numerical display portion of the invention;
FIG. 3 illustrates the signal processor component;
FIG. 4 is a block diagram of the numerical processor;
FIG. 5 shows a word store;
FIG. 6 illustrates the vote taker or majority logic circuit;
FIG. 7 is a block diagram of the shift address register;
FIG. 8 shows waveforms which are helpful in describing FIG. 7 and
FIG. 9 is a diagram of the confidence level light control component.

Referring now to the drawings, wherein life reference characters designate like or corresponding parts throughout the several figures, there is shown in FIG. 1 a conventional PPI repeater 20 which is connected in well known manner to the trigger and antenna servo systems of an IFF interrogating radar (not shown) so that the well known PPI pattern is displayed by repeater 20. Since this pattern is a display of all targets within the effective range of the radar set, at times of high volume over a hundred targets may be simultaneously displayed by the repeater 20. It is, therefore, obviously necessary that the operator be able to quickly and easily select a target or area for IFF evaluation. Many suitable, and broadly functionally equivalent, devices have been developed for this purpose and are known by such names as "joystock," "bowling ball," "electronic pencil" etc. gate controls.

Another suitable such control, and the control chosen herein for the description of a specific embodiment of the present invention, is the "light pencil" gate control which is disclosed in the copending patent application, Ser. No. 525,811 filed Feb. 4, 1966 by Donald J. McLaughlin and Frederick R. Fluhr, now Patent No. 3,328,793. While a fuller description is available in the referred to patent aplication, the reader will probably find the following description of the "light pencil" gate control sufficient for the purpose of comprehending the disclosure of the present invention.

The light sensitive pencil 22 is manipulated by the operator to be near and to sense the four dot pattern 24 which is representative of the geographic (azimuth and range) area which is under IFF evaluation by other, later-described, portions of the invention. Light sensitive pencil 22 is connected by lead 26 to retrace insertion and hook gate control 28 which is in turn connected to video gate 30 by lead 32. Control 28 is connected to control repeater 20 by lead 34 and receives gating, trigger and sweep signals from repeater 20 through lead 36.

The cooperative functioning of pencil 22, control 28 and gate 30 is such that, once the light pencil senses the pattern 24, movement of the pencil to another part of the PPI display of repeater 20 will be accompanied by a movement of the pattern 24 and a corresponding change in the setting of gate 30. In other words, the operator will be able to quickly and easily select a target (an area) for IFF evaluation by merely moving the pencil 22 until pattern 24 surrounds the selected target.

Video gate 30, therefore, is opened at the proper time to pass the video response signals received from the IFF interrogating radar. The signals passed by the gate 30 are carried by lead 44 to a signal processor 46 which is described in more detail in FIG. 3 and subsequent figures. Both the gate 30 and the follow-and-hold stores 40 receive sweep signals from the PPI repeater 20 through lead 42. The component 40 may be any of the known store devices which are suitable for storing the value of the PPI repeater 20 sweep signals, on lead 42, at the instant when the signal on lead 48 signifies that a series of IFF replies of an acceptable level of confidence has been evaluated by signal processor 46. Signal processor 46 receives the decoded video signals through the video gate 30 and the mode selection signal, indicating the mode being interrogated, through lead 45. Processor 46 signals the stores unit 40, through lead 48, when a satisfactory level of confidence in an IFF interrogation reply has been attained. This signal causes the stores unit 40 and the control 28 to produce a bright trace 24' in the PPI display which is representative of the position of the replying target. Signal processor 46 is also connected through lead 50 to the numerical display 52 which is shown in more detail in FIG. 2.

There are many known gating devices suitable for use at gate 30. Among these are the video gate disclosed in the copending patent application, Ser. No. 577,119, filed Sept. 1, 1966, in the names of Frederick R. Fluhr, George L. Hall and Donald J. McLaughlin, now Patent No. 3,304,550. This gate is also described in Report 6372 of the U.S. Naval Research Laboratory, Washington, D.C. which is titled "Polar Video Gating of Radar and IFF Displays Using Cartesian Control" by Frederick R. Fluhr.

At the present time there are at least four conventional modes, or interrogation methods, for practicing IFF. These modes consist of an altitude interrogation mode wherein the response signal includes information as to the altitude of the responding target and three other types of interrogating signal which are variously used by the military services and commercial aviation. The interrogation signals used in these other three modes differ as to coding, but all are intended to cause the transponder installed in the interrogated target to transmit a signal identifying the target by a unique selected identification feature, usually a number which is represented in binary code in the identifying reply signal.

As shown in FIG. 2, the numerical display panel includes three switches 54, 56, and 58, one for each of the three nonaltitude modes of IFF interrogation. The IFF operator selects the mode of IFF he wishes to display, say mode 2, and presses the appropriate switch, in this case 56. If a target in the area selected by light pencil 22 is identified to an acceptable level of cofidence (as discussed later) the selected identification feature, that is a number, is displayed by indicator 62. There is also displayed by indicator 64, if the target responds in the IFF altitude mode, an indication of the altitude of the target. The background in indicators 62 and 64 is illuminated by colored lamps, not shown in FIG. 2, the color being indicative of the confidence level of the IFF return from the target.

Of course, the possibility of many modifications to numerical display 52 is apparent. For example, it may be desired to have visual red lamp alarms if more than one target responds in the area selected by light pencil 22, or if no target responds in this area with an acceptable level of confidence.

Reference is now made to FIGS. 3–9 which show the invention, and particularly signal processor 46, in more detail. However, to avoid an excessive complexity of illustration and description, only the channels for the altitude IFF mode and one other IFF mode have been shown. The reader will, of course, realize that two other IFF mode channels have not been illustrated.

The signal processor 46 receives input signals from two sources. Video gate 30 is opened at the proper time to pass the video responses of the target within the area, or hook gate, selected by light pencil 22, through lead 44. The signals on lead 45, which identify the mode being interrogated, are the second input to signal processor 46. If the response from the target is (say) in mode 2, then the signal on lead 45 will open gate 102 and the decoded video signal (containing the selected identification feature) from the IFF decoder will be passed to a numerical processor 106 which is described later with FIGS. 4–9. For the present it will be sufficient for the reader to comprehend that the numerical processor 106 stores the mode 2 responses until a suitable level of confidence is obtained, whereupon the processor 106 produces a variety of signals on lead 108. If selector switch 56 in display 52 has been closed, the mode selector switching device 110 will pass the signals on lead 108 that (1) light the appropriate colored lamps 112 which are indicative of the confidence level of the response, (2) drive the binary to octal converter 114 which in turn drives the selected identification feature 62 in display 52 (FIG. 2) and (3) selects the related position store in unit 40 through lead 48 to produce the trace 24' in the PPI display which is indicative of the responding target position at which the minimum confidence requirement was met. Except that the altitude mode is not subject to the selective switching of components 54, 56, 58, and 110, the altitude channel is very similar to the mode 2 channel and includes numerical processor 104 which, upon receiving responses of a satisfactory confidence level, lights colored lamps 116 and drives binary to decimal converter 118 which in turn drives indicator 64 in display 52.

Returning now to a more complete description of numerical processor 106, which is identical to the numerical processors 104, etc. used in the other IFF mode channels, the signals from video gate 30 and from the mode gate 102 (FIG. 3) are connected to five word input gates 200a through e, which are in turn each connected to five word stores 202a through e as shown in FIG. 4. The word stores 202 will be described later in more detail in connection with FIG. 5.

The confidence level criteria described herein, as a result of a completely arbitrary design choice, is that a minimum level of confidence will be established if the IFF interrogation results in three of the five stores 202a through e having identical (12 bit) responses stored therein. At this point it may be of assistance to point out that many leads shown by a single line, as the connection between gates 200 and stores 202, are in actuality 12 separate leads carrying in parallel the decoded 12 bit selected identification feature portion of the IFF response.

Each of the word stores 202a through e is connected to vote taker 204 which is further illustrated in FIG. 6 and which will be later described in more detail when discussing that figure. For the present it need only be set forth that vote taker 204 determines which of the IFF responses contained in the word stores 202a through e are identically similar to the response contained in the majority of the stores and also sends signals relating to that determination through lead 206 to address shift register 208. Vote taker 204 also places a signal similar to the signals contained in the majority of word stores 202a through e on the lead 108 for use in driving the converters 114 and 118 and the indicators 62 and 64 (FIG. 3). The address shift register is triggered by signals from the mode gate and functions initially to sequentially open the word input gates 200a through e and thereby sequentially enter the IFF response signals from the mode gate 100 into the word stores 202a through e, that is the first response signal from the mode gate is gated through gate 200a into word store 202a, the second response signal is gated into word store 202b, etc. This sequencing action will continue until the responses cease or until there is a determination that three of the five signals in word stores 202a through e are identical. When a minimum confidence level has been reached, that is three of the IFF response signals contained in word stores 202a through e are identical, the sequencing is discontinued and further IFF response signals are gated into the first of the word stores which does not contain a majority signal. Thus, if stores 202a, b and d contain the same IFF response signal, all future IFF response signals will be gated into word store 202c until the response signal therein agrees with the majority signal and then any subsequent signals are gated into word store 202e until it agrees with the majority signal. The reader will, of course, realize that the term future, as used in the preceding sentence, applies only to the period of time during which the operator does not change the area under IFF interrogation by manipulation of the light pencil 22.

The above described patterns for selectively gating the IFF responses into the word stores 202a through e are controlled by address register 208 which is described in more detail in a subsequent discussion of FIG. 7. Address shift register 208 places signals on lead 210 which selectively open the input gates 200a through e and similarly selective signals on lead 212 which activate reset circuits 214a through e to selectively erase the signal already contained in word stores 202a through e and thereby place these word stores in condition to accept another IFF response signal. The word stores 202a through e and address shift register 208 may also be simultaneously reset by means of an exterior reset signal on lead 215. This latter signal may occur, for example, when the operator manipulates light pencil 22 to change the gated area under IFF interrogation.

The address shift register 208 is connected through lead 216 to confidence level light control 218. Control 218 is described in more detail when FIG. 9 is subsequently discussed. Output signals of control 218 are combined with the output signals from vote taker 204 on the lead 108. Together these signals are connected by lead 108 to control one of the indicators 62 or 64 and one of the colored lamp assemblies 112 or 116 (FIG. 3) and by lead 48 to energize the stores unit 40 and control 28 (FIGS. 2 and 3) to produce the bright trace 24' on the PPI display.

FIG. 5 shows diagrammatically and in somewhat more detail the circuit organization of one of the word stores 202. As mentioned previously, the selected identification feature portion of the decoded IFF response signal is conventionally a 12 bit parallel signal. This 12 bit signal is passed in parallel by the word input gates 200 and are stored in 12 memory devices 250a through l, the outputs of which are connected to the vote taker 204. The signals in the memory devices 250a through l are erased by the reset device 214 which is in turn controlled either by address shift register 208 or by an external reset. Both the memory devices 250 and the reset device 214 may be any of a known variety of such devices and typically could be in the form of flip flops.

FIG. 6 illustrates a portion of the vote taker 204. To avoid overcomplexity, the illustration has been limited to the group of components needed for the evaluation of one bit, say the fourth bit, of the five IFF response signals contained in word stores 202a through e. The reader will, of course, realize that 12 such groups of bit evaluation components are needed in each of the numerical processors 104, 106, etc. (FIG. 3). Thus, if the system has the capability of interrogating in four IFF modes (as shown in FIG. 2), then the system must include 48 groups of the bit evaluation components illustrated in FIG. 6.

The binary signal from the fourth bit, that is from the memory device 250d (FIG. 5) of the word stores 202a through e, are respectively connected to the vote taker 204 by leads 300a through e. These leads are all connected to a threshold circuit 302 and respectively to compare circuits 304a through e. The output signal of threshold circuit 302 (on lead 306) is either a logical zero or a logical one, depending on which of these signals appears on the majority of the leads 300a through e. Lead 306 is connected to supply the output signal of threshold circuit 302 to lead 108 (FIG. 3) to drive one of the converters 114 or 118 and one of the indicators 62 or 64. Lead 306 is also connected to each of the compare circuits 304a through e. The compare circuits 304 produce output signals if, and only if, the signals received through leads 300 from the word stores 202 and through lead 306 from the threshold circuit 302 are the same, that is both are logical zeros or both are logical ones. The output of the compare circuits 304a through e are respectively connected to AND gates 308a through e. These AND gates also are connected to receive the output signals of 11 other compare circuits (not shown) which are, of course, the result of similar analysis of the other 11 bits of the five IFF response signals contained in the word stores 202a through e. The AND gates 308a through e each produce a signal if, and only if, a signal is received from each of the 12 compare circuits 304 connected to the individual AND gate. The output signals of the AND gates 308a through e are connected by lead 206 to the address shift register 208 (FIG. 4).

Referring now to FIG. 7 which illustrates the address shift register 208 in block diagram form and to FIG. 8 which shows waveforms which are useful in understanding the operation of the address shift register 208.

When the operator begins the IFF interrogation of an area, that is, when the gated area under IFF interrogation is changed by manipulation of light pencil 22, the address shift register is reset by a signal carried on lead 215. This signal closes all of the gates 200a through e (FIG. 4) by setting the flip flop circuits 400a through f so that the a through f output signals of the flip-flops are high and the $\bar{a}$ through $\bar{f}$ outputs are low, as shown in the waveforms in FIG. 8. The first response admitted by the mode gate 100, 102 etc. (FIG. 3) serves to trigger flip-flop 400a so that the output signal a goes low and the $\bar{a}$ output goes high (FIG. 8). The output of NAND gate 402a than goes low because b and $\bar{a}$ are both high. This in turn causes OR gate 404a to produce a signal which opens input gate 200a (FIG. 4) and energizes reset circuit 214a.

It will be evident that (as used herein) a NAND gate does not produce a signal output if, and only if, both input signals are high and an OR gate produces an output signal if either one or both of the input signals are high but does not produce an output signal if both of the inputs are low.

The second response admitted by the mode gate serves to trigger flip-flop 400b through the associated input AND gate 406b which was opened by the a signal from flip-flop 400a. Triggering flip-flop 400b causes the output of NAND gate 402b to go low and the output of NAND gate 402a to go high, thereby causing OR gate 404b to open input gate 200b and energize reset circuit 214b and OR gate 404a to close input gate 200a. This cooperative action is sequentially repeated by the components 400c, 402c, 404c and 406c, then 400d, 402d, 404d and 406d, then 400e, 402e, 404e and 406e, whereupon the sixth response admitted by the mode gate triggers the flip-flop 400f and thereby closes the input gate 200e. The $\bar{f}$ signal from flip-flop 400f also enables recycle NAND gates 408a through e which are respectively connected to receive the output signals of the vote taker AND gates 308a through e (FIG. 6). The output signals of the recycle NAND gates 408a through e are respectively connected to OR gates 404a through e. Output signals of the recycle NAND gates 408 are also connected as input signals in all of the following 408 gates; thus the output of gate 408a serves as an input signal to gates 408b through e, the output of gate 408b serves as an input signal to gates 408c through e, etc.

As will be explained in more detail later, the confidence level light control 218 functions to provide a signal when three of the IFF response signals contained in the word stores 202a through e are identical. This signal is connected to the flip-flops 400a through e by a conductor 216a in lead 216 and may also serve in an obvious manner as a source of the optional no agreement warning signal previously mentioned in describing FIG. 2. Another conductor, 216b, in lead 216 connects confidence control 218 to flip-flop 400d. As will be discussed later in connection with the description of control 218 (FIG. 9), this control is inhibited until the arrival of the third IFF response signal. The inhibit condition of control 218 is released by the arrival of the third IFF response in, and the associated change of condition of, the flip-op 400d.

The operation of the address shift register 208 is probably by now evident. The first five IFF responses are sequentially gated by the components 400, 402 and 404 (all a through e) into word input gates 200a through e. The third response also serves to release the inhibit on confidence control 218. If all of the first five IFF responses are identical, the word input gates 200a through e are kept closed by the agreement signals from AND gates 308a through e which are connected to the recycle gates 408a through e.

If less than three of the IFF responses contained in word stores 202a through e are the same, the no agreement signal from the confidence control 218 resets the flip-flops 400a through e and the IFF responses will continue to be sequentially gated into the gates 200a through e together with a sequential energization of the reset circuits 214a through e. This continues until the signals received from the AND gates 308a through e of vote taker 204 indicate a minimum level of three agreeing signals in the word stores 202a through e, whereupon the signal from the confidence level control 218 (on lead 216a) changes and further IFF responses are gated only through those gates 200a through e which are associated with word stores 202a through e and AND gates 308a through e that do not agree with the majority signal. Thus, if after five IFF responses, the signals contained in word stores 202c, d and e agree, the sixth signal is gated through word input gate 200a, i.e. input gate 200a is opened, by the cooperative action of flip-flop 400f and recycle gate 408a. Gate 408a acting in response to the disagreement signal from AND gate 308a, inhibits the other recycle gates 408b through e. If after (say) three more IFF responses, the signal in word store 202a agrees with the signals in word stores 202c, d and e, subsequent responses will be gated through word input gate 200b until the signal in word store 202b agrees with the signals in the other word stores or until the IFF responses cease or until the light pencil 22 is manipulated to set a different area gate for IFF interrogation. When all of the signals in word stores 202a through e are in agreement, the signals from AND gates 308a through e cause gates 408a through e to maintain all of the word input gates 200a through e in closed condition.

Referring now to FIG. 9 which illustrates the confidence level light control 218 in block diagram form. The signals from AND gates 308a through e (FIG. 6) are connected to each of the level threshold circuits 500, 502 and 504 which respectively produce a signal when three, four and five of the AND gates 308a through e produce signals. Level threshold circuits 500, 502 and 504 may be any of the well known voltage responsive circuits which produce a signal when the input (or sum of the input) signals exceed a certain threshold voltage.

The output signals of circuits 500, 502 and 504 are connected to red and green light controls 506 and 508 in such a way as (1) turn on red lights 510 when at least three of the gates 308a through e produce signals; (2) turn on green lights 512 when at least four of the gates 308a through e produce signals and (3) turn off red lights 510 when all of the gates 308a through e produce signals. This light control sequence causes the background of indicators 62 and 64 in FIG. 2 to be sequentially red, yellow and green as the 3, 4 and 5 level of response agreement is reached. As illustrated, the light control 506 may be series connected NOR and AND gates and the light control 508 may be an OR gate. It will, of course, be realized that red and green lights 510 and 512 comprise the colored lamps 112 and 116 in FIG. 3. The reader will, of course, also recognize that the red, yellow, green color coded incremental indication of the level of confidence in the displayed reply may, in certain critical instances, constitute an improvement of great significance over the "go-no go" indications of prior IFF systems.

The red and green lights 510 and 512 are inhibited by inhibit control 514 until (as previously described) the signal from address shift register 208 arrives on lead 216b upon the arrival of the third IFF response signal in the shift register. The inhibit control 514 is reset together with the address shift register 208 when the video gate 30 is reset by manipulation of light pencil 22. The output signal from threshold circuit 500 is also connected to address shift register 208 by lead 216a for the purpose of recycling the address shift register 208 in the event that the minimum level of confidence (3 signals from AND gates 308a through e) is not attained. The output signal from threshold circuit 500 is also connected by lead 48 to the follow and hold circuit 40 (FIG. 1) to cause the circuit 40 to derive the coordinates of the target when the 3 of 5 confidence is obtained. These coordinate signals then cause the control 28 to insert signals that cause trace 24' in the PPI display which is, of course, indicative of the target position producing the majority IFF responses contained in word store 202a through e. The output signal from threshold circuit 500 may also be used, if desired, to energize white light 516 which can be used to illuminate the numerals in indicators 62 and 64 in FIG. 2. White lights 516 are inhibited both by inhibit control 514 and by a manual turn-on located at OR gate 518.

The operation of the invention will now be summarized. By manipulating the light pencil 22, the operator chooses a geographic area, represented on the PPI display by pattern 24, wherein is a target that the operator desires to interrogate by IFF radar. This manipulation sets the video gate 30 to allow only the IFF responses from the selected area to reach the numerical processors 104, 106, etc. (FIG. 3). All modes being interrogated are processed simultaneously. By using the switches 54, 56, 58, (FIG. 2) the operator chooses the IFF mode to be displayed for evaluation. This choice determines which one of the numerical processors 106 etc. is connected, together with numerical processor 104 (FIG. 3), to drive the identification indicator 62. The altitude mode is always processed and indicated by indicator 64. The background of indicators 62 and 64 are colored to represent the confidence level of the IFF response being displayed.

Within the numerical processors the IFF response signals are sequentially gated under the control of the address shift register 208 (FIGS. 4 and 7) and according to predetermined patterns into word stores 202a through e (FIGS. 4 and 5). While in these stores the response signals are evaluated according to majority logic by vote taker 204 (FIGS. 4 and 6) which furnishes signals that control the address shift register 208 and the confidence level light control 218 (FIGS. 4 and 9) and determines the responding target position as represented by trace 24' on the PPI display. The control 218 turns the colored lights on and off to cause the background of the identification and altitude indicators 62 and 64 to be red, yellow or green depending upon whether three, four or five of the response signals in word stores 202a through e agree.

It will be apparent that there has been disclosed an improved IFF reply display and processing system which can be easily and quickly controlled to receive and display IFF replies from a selected area; which displays, by colored background, the confidence level of the target replies displayed; which provides a flexibility allowing for target interrogation and reply display in any of four modes and in which the location of the replying target is derived and displayed.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. An IFF reply display and processing system comprising:
   Adjustable gating means which pass IFF replies from targets in a selected area and which reject IFF replies from targets not in said selected area;
   Signal processing means connected to receive the IFF replies passed by said gating means and to evaluate said IFF replies to determine the incremental level of confidence of said replies by the agreement between said replies and
   Display means connected to said signal processing means to indicate by color code said incremental level of confidence of said IFF replies and to indicate the position of a target replying with an acceptable level of confidence.

2. An IFF reply display and processing system as set forth in claim 1 wherein the IFF relay from each target includes a signal representative of a number and wherein said display means displays said number.

3. A display and processing system for use in an IFF system wherein the replies from a target in response to an IFF interrogation include a signal representing a number comprising:
   Adjustable gating means connected to receive said IFF replies and to pass the IFF replies from targets in a selected area and to reject the IFF replies from targets not in said selected area;
   An address shift register;
   A plurality of input gates connected to said address shift register and to said adjustable gating means and individually controlled by said address shift register to either pass or reject the IFF replies passed by said adjustable gating means;
   A plurality of word stores, each connected to one of said plurality of input gates to store the IFF replies passed by said gates;
   Vote taker means connected to said word stores to determine by majority logic the etxent of agreement between the IFF replies stored in said word stores and to produce signals indicative of said extent of agreement and
   Display means connected to receive said signals produced by said vote taker means and to indicate said extent of agreement and to indicate the position of a target replying with an acceptable extent of agreement.

4. A display and processing system as set forth in claim 3 wherein said display means also indicates the number represented by the agreeing IFF replies stored in said word stores.

5. A display and processing system as set forth in claim 4 wherein said display means indicates said extent of agreement by colored lights.

6. A display and processing system for use in an IFF system wherein the replies from a target in response to an IFF interrogation include a signal having a plurality of binary bits representing a number which identifies the target responding, comprising:
   Adjustable gating means connected to receive said IFF replies and to pass the IFF replies from targets in a selected area and to reject the IFF replies from targets not in said selected area;
   An address shift register;
   A plurality of input gates connected to said address shift register and to said adjustable gating means and individually controlled by said address shift register to either pass or reject the IFF replies passed by said adjustable gating means;
   A plurality of word stores, each connected to one of said plurality of input gates to receive the IFF replies passed by said gates, each word store including a plurality of memory devices, each of said memory devices being connected to receive and store one of the binary bits contained in the IFF reply passed by said one connected input gate;
   Vote taker means connected to each memory device in each word store to determine by majority logic the extent of agreement between the IFF replies stored in said word stores and to produce signals indicative of said extent of agreement and
   Display means connected to receive said signal produced by said vote taker means and to indicate said extent of agreement and to indicate the position of a target replying with an acceptable extent of agreement.

7. A display and processing system as set forth in claim 6 wherein said vote taker means comprises:
   A plurality of threshold circuits, each threshold circuit being connected to all of the memory devices of related order in said plurality of word stores, each threshold circuit producing a signal representative of the signal in the majority of the memory devices connected to said threshold circuit;
   a plurality of compare circuits, each compare circuit being connected to receive said signal produced by one of said threshold circuits and a signal from one of the memory devices connected to said threshold circuit, each of said compare circuits producing a signal indicative of the agreement or disagreement of the two signals received by said compare circuit and
   a plurality of AND gates, each AND gate connected to receive the signals produced by all of the compare circuits connected to said memory devices in one of said plurality of word stores, each AND gate producing a signal if, and only if, all of said compare circuits connected thereto produce signals indicative of agreement between said two signals received by said compare circuit.

8. A display and processing system as set forth in claim 7 wherein said display means indicates the number of said AND gates producing a signal.

9. A display and processing system as set forth in claim 8 wherein said display means indicates the number represented by the binary bit signal stored in said word store connected to said AND gates producing signals.

10. A display and processing system as set forth in claim 9 wherein said number representing said stored binary bit signal is displayed against a colored background, the color of said background being indicative of the number of said AND gates producing signals.

11. An IFF reply display and processing system comprising:
   means for selecting an area for IFF interrogation;
   gating means controlled by said selecting means, said gating means passing IFF replies from targets in said selected area and rejecting IFF replies from targets not in said selected area;
   signal processing means connected to receive the IFF replies passed by said gating means and to evaluate said IFF replies by majority logic to determine the incremental level of confidence of said replies by the agreement between said replies and display means connected to said signal processing means to indicate by color coded lights said incremental level of confidence of said IFF replies.

12. An IFF reply display and processing system as set forth in claim 11 wherein said selecting means includes a PPI display device, a light sensitive pencil and control means connecting said light sensitive pencil and PPI display device, whereby manipulation of said light sensitive pencil in proximity of said PPI display device causes said control to produce a signal which controls said gating means.

13. A display and processing system for use in an IFF system wherein the replies from a target in response to an IFF interrogation include a signal having a plurality of binary bits representing a number which identifies the target responding, comprising:

means for selecting an area for IFF interrogation;

gating means controlled by said selecting means, said gating means passing IFF replies from targets in said selected area and rejecting IFF replies from targets not in said selected area;

an address shift register;

a plurality of input gates connected to said address shift register and to said gating means and individually controlled by said address shift register to either pass or reject the IFF replies passed by said gating means;

a plurality of word stores, each connected to one of said plurality of input gates to receive the IFF replies passed by said gates, each word store including a plurality of memory devices, each of said memory devices being connected to receive and store one of the binary bits contained in the IFF reply passed by said one connected input gate;

vote taker means connected to each memory device in each word store to determine by majority logic the extent of agreement between the IFF replies stored in said word stores and to produce signals indicative of said extent of agreement and display means connected to receive said signals produced by said vote taker means and to indicate said extent of agreement and to indicate the position of a target replying with an acceptable extent of agreement.

14. A display and processing system as set forth in claim 13 wherein said vote taker means comprises:

a plurality of threshold circuits, each threshold circuit being connected to all of the memory devices of related order in said plurality of word stores, each threshold circuit producing a signal representative of the signal in the majority of the memory devices connected to said threshold circuit;

a plurality of compare circuits, each compare circuit being connected to receive said signal produced by one of said threshold circuits and a signal from one of the memory devices connected to said threshold circuit, each of said compare circuits producing a signal indicative of the agreement or disagreement of the two signals received by said compare circuit and a plurality of AND gates, each AND gate connected to receive the signals produced by all of the compare circuits connected to said memory devices in each of said plurality of word stores, each AND gate producing a signal if, and only if, all of said compare circuits connected thereto produce signals indicative of agreement between said two signals received by said compare circuit.

15. A display and processing system as set forth in claim 14 wherein said display means indicates the number of said AND gates producing a signal.

16. A display and processing system as set forth in claim 15 wherein said display means indicates the number represented by the binary bit signal stored in said word store connected to said AND gates producing signals.

17. A display and processing system as set forth in claim 16 wherein said number representing said stored binary bit signal is displayed against a colored background, the color of said background being indicative of the number of said AND gates producing signals.

18. A display and processing system for use in an IFF system wherein the replies from a target in response to an IFF interrogtation include a signal having a plurality of binary bits representing a number which identifies the target responding, comprising:

a PPI display device, a light sensitive pencil, video gate control means connected to said PPI display device and to said light sensitive pencil, whereby manipulation of said light sensitive pencil in proximity of said PPI display device causes said video gate control to produce a signal representative of an area selected for IFF interrogation;

video gate means connected to receive said IFF replies and controlled by said signal produced by said video gate control to pass IFF replies from targets in said selected area and to reject IFF replies from targets not in said selected area;

an address shift register;

a plurality of input gates connected to said address shift register and to said video gate means and individually controlled by said address shift register to either pass or reject the IFF replies passed by said video gate means;

a plurality of word stores, each connected to one of said plurality of input gates to receive the IFF replies passed by said input gates, each word store including a plurality of memory devices, each of said memory devices being connected to receive and store one of the binary bits contained in the IFF reply passed by said one connected input gate;

vote taker means connected to each memory device in each word store to determine by majority logic the extent of agreement between the IFF replies stored in said word stores and to produce signals indicative of said extent of agreement; and display means connected to receive said signals produced by said vote taker means and to indicate said extent of agreement.

19. A display and processing system as set forth in claim 18 wherein said vote taker means comprises:

a plurality of threshold circuits, each threshold circuit being connected to all of the memory devices of related order in said plurality of word stores, each threshold circuit producing a signal representative of the signal in the majority of the memory devices connected to said threshold circuit;

a plurality of compare circuits, each compare circuit being connected to receive said signal produced by one of said threshold circuits and a signal from one of the memory devices connected to said threshold circuit, each of said compare circuits producing a signal indicative of the agreement or disagreement of of the two signals received by said compare circuit; and a plurality of AND gates, each AND gate connected to receive the signals produced by all of the compare circuits connected to said memory devices in each of said plurality of word stores, each AND gate producing a signal if, and only if, all of said compare circuits connected thereto produce signals indicative of agreement between said two signals received by said compare circuit.

20. A display and processing system as set forth in claim 19 wherein said display means indicates the number of said AND gates producing a signal.

21. A display and processing system as set forth in claim 20 wherein said display means indicates the number represented by the binary bit signal stored in said word store connected to said AND gates producing signals.

22. A display and processing system as set forth in claim 21 wherein said number representing said stored binary bit signal is displayed against a colored background, the color of said background being indicative of the number of said AND gates producing signals.

23. A display and processing system as set forth in claim 22 and further including a position correlation store circuit connected to said vote taker means, said store circuit producing a signal representative of the position of a target replying with an acceptable extent of agreement and said signal produced by said store circuit is connected to said PPI display device.

References Cited

UNITED STATES PATENTS

| | | | |
|---|---|---|---|
| 2,691,162 | 10/1954 | Geer | 343—6.5 |
| 2,849,707 | 8/1958 | White | 343—7.3 |
| 3,058,104 | 10/1962 | Garfinkel et al. | 343—6.5 |

RICHARD A. FARLEY, *Primary Examiner.*

C. L. WHITHAM, *Assistant Examiner.*

U.S. Cl. X.R.

343—7.3